March 18, 1969  J. D. BIDLACK  3,433,266
POSITIVE CENTERING SERVOVALVE HAVING MOVABLE SPRING BACKUP
Filed March 22, 1967
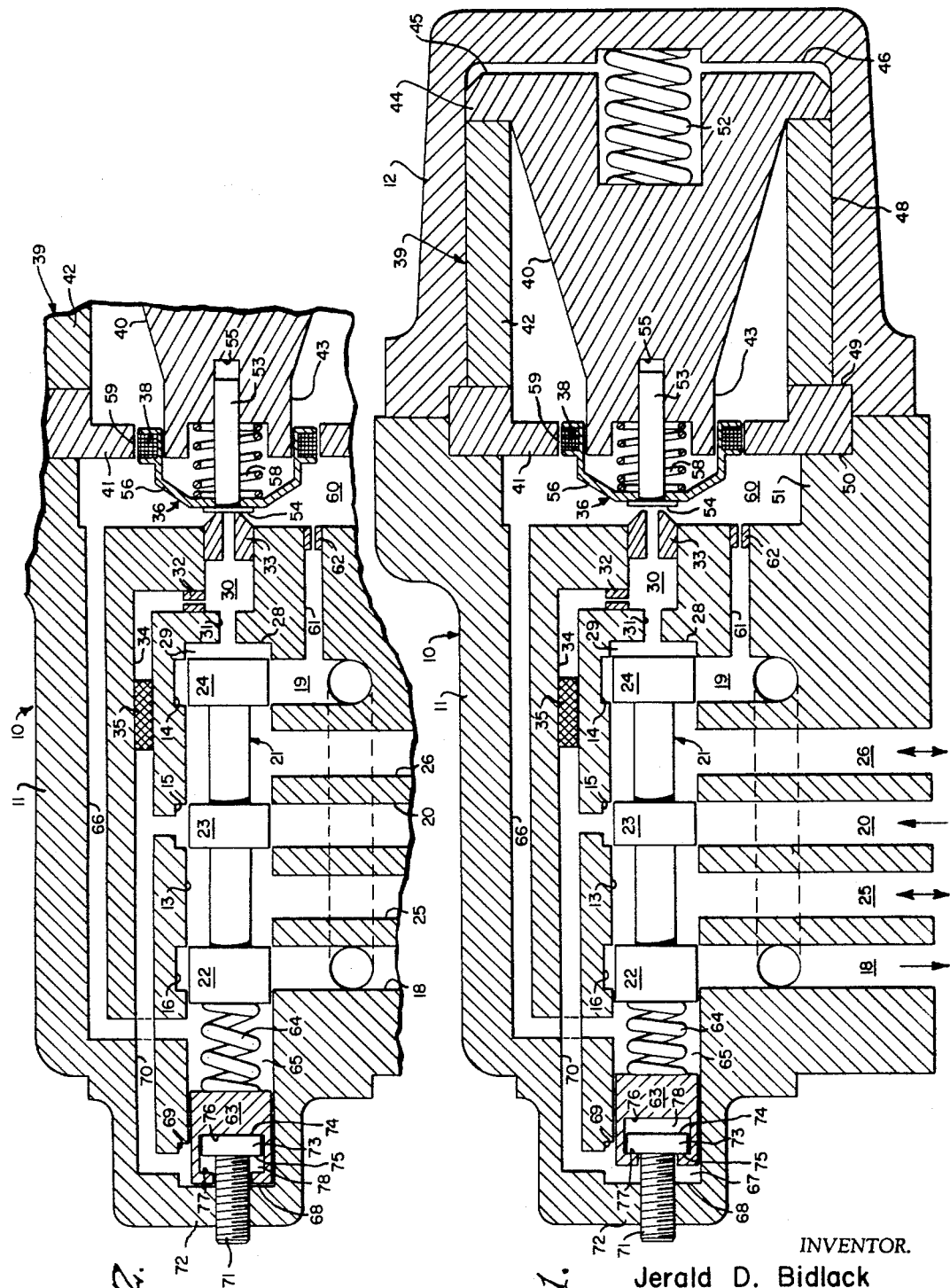
INVENTOR.
Jerald D. Bidlack
BY
Popp and Sommer
ATTORNEYS United States Patent Office 3,433,266
Patented Mar. 18, 1969

3,433,266
POSITIVE CENTERING SERVOVALVE HAVING MOVABLE SPRING BACKUP
Jerald D. Bidlack, East Aurora, N.Y., assignor to Moog Inc., East Aurora, N.Y., a corporation of New York
Filed Mar. 22, 1967, Ser. No. 625,130
U.S. Cl. 137—625.61                    6 Claims
Int. Cl. F16k 11/32

ABSTRACT OF THE DISCLOSURE

A servovalve having a valve slide the position of which is normally obtained by a balance of a force exerted by a spring in a chamber at one end of the slide and a force due to the controlled pressure of fluid in a chamber at the other end of the slide, the null position of the slide being maintained when there is no signal input and fluid supply pressure is below a predetermined minimum operating level by moving the backup for the spring to reduce appropriately the force exerted by this spring.

Background of the invention

This invention relates to improvements in a servovalve of that type which has a valve slide biased to move in one direction by a spring in a chamber at one end of the slide, the position of the slide being normally controlled by varying the pressure of fluid in a chamber at the other end of the slide. This fluid pressure is controlled by a variable orifice produced by the spacing between a movable reaction member and a nozzle for discharging fluid. This reaction member is suitably preloaded toward the nozzle tip. Normally, the effective area of the variable orifice is responsive to a signal input to the reaction member and thus a control pressure is developed in the end chamber for the slide and applied to move the slide until the spring and fluid pressure forces balance.

When such a servovalve is pressurized with hydraulic fluid, the slide end chamber is pressurized through an inlet orifice with which the nozzle also communicates. This chamber pressure will be equal to supply pressure until the pressure force acting on the nozzle area is equal to the preload force on the reaction member. As system pressure is increased above this level, the reaction member will displace relative to the nozzle and maintain a constant chamber pressure irrespective of system pressure, provided there is no signal input to the reaction member. When there is a signal input, however, the oppositely directed spring and pressure forces on the slide determine its position relative to pressure and return ports with which control elements on the slide are operatively associated to control the flow of fluid through actuating ports leading to an actuator to be fluidly driven. The result is a slide motion and therefore output flow, proportional to input signal to the reaction member.

It will be seen that when system pressure is building up from zero to that level which will displace the reaction member, as occurs during a start-up condition, and also when system pressure is falling from said level toward zero, as occurs during a close-down condition, the spring force will displace the slide hardover since insufficient pressure force is available to counterbalance the spring force.

Summary of the invention

The present invention provides a servovalve of the aforementioned type but constructed so that its valve slide will not be displaced or go hardover when system pressure is below a predetermined minimum operating level and there is no signal input to the servovalve. This is achieved according to the present invention by providing a backup member for the valve slide spring which is movable, applying fluid supply pressure against the backup member to urge the same to move toward the slide, and limiting the extent to which the backup member can move in opposite directions.

Brief description of the drawing

FIG. 1 is a diagrammatic longitudinal sectional view of an improved servovalve embodying the present invention, and showing the condition of such servovalve when system pressure is above a predetermined minimum operating level.

FIG. 2 is a similar but fragmentary view of the servovalve shown in FIG. 1 and illustrating the condition of the servovalve when system pressure is zero.

Description of the preferred embodiment

The improved servovalve of the present invention is shown as comprising a body indicated generally at 10 including a main section 11 and a removable cup-shaped head section 12. Body section 11 has a cylindrical bore 13 internally formed adjacent its one end, the right end as viewed in FIG. 1, to provide a return port 14, and to the left of this port a pressure port 15, and further to the left of this latter port another return port 16. A main return passage 18 leads from left return port 16 to the base of body section 11. A branch return passage 19 communicatively connects right return port 14 with passage 18. A main supply or pressure passage 20 leads from center port 15 to the base of body section 11.

Bore 13 serves as a slideway for a valve slide represented generally by the numeral 21 which is shown as a spool including a left cylindrical end lobe 22, a center cylindrical lobe 23 and a right cylindrical end lob 24. When this valve spool is in a null or no signal input position as shown, left lobe 22 closes left return port 16, cylindrical lobe 23 and a right cylindrical end lobe 24. closes right return port 14.

Body section 11 is also shown as formed to provide a first actuating port passage 25 leading from the portion of bore 13 between lobes 22 and 23 to the base of this body section. A similar second actuating port passage 26 leads from the portion of bore 13 between lobes 23 and 24 to the base of body section 11. These passages 25 and 26 are intended for connection to an actuator (not shown).

The right end wall 28 of bore 13 is spaced from the opposing and outer end face of spool lobe 24 to provide therebetween a right spool end chamber 29. Adjacent this chamber, main body section 11 is shown as formed to provide a control chamber 30 which is in constant communication with spool end chamber 29 via central passage 31. Control chamber 30 is shown as having a radial inlet passage in which a flow restrictor member 32 is arranged, and an axial outlet passage in which a flow nozzle member 33 is arranged. The upstream end of the bore of restrictor 32 is shown as communicating with pressure port 15 via a branch supply passage 34 formed in main body section 11. A suitable filter 35 is shown arranged in passage 34.

A reaction member indicated generally at 36 is positioned opposite the discharge end or tip of the nozzle member 33 so as to be impinged by fluid discharged therefrom and is movable with respect to this nozzle member to provide a variable spacing therebetween and hence a variable orifice through which fluid is discharged. Means are provided for moving reaction member 36 relative to the nozzle tip in response to an input signal so as to vary the effective area of such orifice and thereby regulate the pressure in right spool end chamber 29 and hence the axial position of valve spool 21 relative to body section 11. While such means may be variously constructed so as to be responsive to an electrically, mechanically or gaseously operated device as desired, the preferred means shown comprises a movable coil 38 of an electromagnetic force motor means indicated generally at 39 which also includes an inner pole piece 40 of magnetic material, an outer pole piece 41 of magnetic material, and a permanent magnet ring 42. Coil 38 is suitably carried by reaction member 36.

Inner pole piece 40 is a post-like member having a small end and a large end. The small end is provided by an external cylindrical surface portion 43 arranged concentrically with nozzle member 33. The large end of this inner piece has a radially extending annular flange portion 44 and a flat end face 45 which opposes in slightly spaced relation the inner end wall surface 46 of the cup-shaped head section 12. This head section is shown as having an internal cylindrical side wall 48 which closely fits the cylindrical peripheries of flange portion 44 of the inner pole piece and of magnet ring 42. The rim of the cup-shaped head section 12 is shown as provided with a counterbore leaving an axially facing annular shoulder 49 which engages one radial flat end face of outer pole piece 41. The other radial flat side of this outer pole piece 41 is shown as engaging a shoulder 50 formed by a two-stepped recess 51 in the adjacent end of main body section 11. In this manner, outer pole piece is clamped between body sections 11 and 12 and these sections are held together by suitable removable fastening means (not shown).

Flange portion 44 of inner pole piece 40 is urged against one end of permanent magnet ring 42, in turn urged against outer pole piece 41, by a spring 52. This spring is shown as arranged in opposing and alined recesses provided in the end wall of cover section 12 and the large end of inner pole piece 40.

Reaction member 36 is shown as comprising a headed pin 53 coaxially arranged with respect to nozzle member 33 and having an end face or target surface 54 impinged by fluid discharged by this nozzle member. The shank of pin 53 is shown as slidably arranged in a recess 55 provided in inner pole piece 40 and supports a bobbin 56 on which coil 38 is wound. A helical compression spring 58 is shown arranged between this bobbin 56 and inner pole piece 40, partially in a suitable recess in the latter, and serves to hold this bobbin against the shoulder on headed pin 53 and also to bias or preload the reaction member 36 as a whole toward nozzle member 33. Coil 38 is supported in the annular air gap between cylindrical surface 43 on inner pole piece 40 and a surrounding and radially spaced concentric cylindrical surface 59 on outer pole piece 41.

The space provided by the inner portion of stepped counterbore 51 provides a sump chamber 60 which receives fluid discharged by nozzle member 33. A drain passage 61 is provided in main body section 11 and communicatively connects sump chamber 60 to branch return passage 19. This drain passage 61 is shown as having an anti-surge flow restrictor member 62 arranged therein.

Turning now to the left end portion of the servovalve, bore 13 is extended to the left of left spool lobe 22 sufficiently to accommodate a backup piston 63 arranged for reciprocable movement coaxially of valve spool 21, and a spool end spring 64 arranged between piston 63 and the valve spool. The space between this piston 63 and valve spool 21 provides a spool end chamber 65 which is shown as having constant communication with sump chamber 60 via passage 66 formed internally within main body section 11.

Body bore 13 is extended sufficiently to the left so that its left end wall 68 has a clearance with respect to the left end of backup piston 63 even when this piston is in its extreme leftward position, as depicted in FIG. 2, to provide an actuating chamber 67. This chamber 67 is shown as in constant communication with a port 69, in turn communicating with a branch supply passage 70 leading to and communicating with pressure port 15. In this manner, the pressure that exists in pressure port 15 is at all times present in actuating chamber 67.

Means are provided for limiting the axial movement of backup piston 63 in opposite directions. While such means may be variously constructed, the same is shown as comprising an adjusting screw 71 mounted on the end wall portion 72 of main body section 11, and an enlarged head 73 carried by the inner end of this screw. This head has flat radial stop surfaces 74 and 75 on opposite sides thereof which surfaces are adapted severally to engage surfaces 76 and 77, respectively, provided as end walls of a recess 78 formed in backup piston 63, such recess at its outer end allowing screw 71 to extend therethrough. Piston surfaces 74 and 75 are spaced apart axially farther than stop surfaces 76 and 77.

*Operation*

Assuming pressurized fluid such as hydraulic oil at a suitable normal operating pressure, say 1000 pounds per square inch (hereinafter referred to as p.s.i.), is applied to pressure passage 20, this pressure is also transferred via connected passage 70 to actuating chamber 67 and is still further transferred via connected passage 34 to restricted inlet orifice member 32 for control chamber 30. When the fluid is at this normal operating pressure level, the pressure force in actuating chamber 67 is sufficient to overcome the oppositely directed spring force exerted by spool end spring 64 so that piston surface 75 engages stop surface 77, as depicted in FIG. 1. Also, when the fluid is at this operating pressure level, the pressure force against the nozzle area on reaction member surface 54 is sufficient to overcome the preload of spring 58 so that fluid will be discharged through the variable orifice provided between the tip of nozzle member 33 and this surface 54. The position of this reaction member relative to the nozzle member maintains a pressure in control chamber 30, in turn transmitted via passage 31 to right spool end chamber 29 to apply a pressure force against the right end face of valve spool 21 which will counterbalance the spring force exerted against this spool in the opposite direction by spool end spring 64 arranged in left spool end chamber 65 and thereby maintain the valve spool in a null position, as depicted in FIG. 1, when there is no signal input to the valve. Screw 71 is axially adjustable relative to main body section 11 and hence relative to valve spool 21 in order to adjust the preload on spool end spring 64, when backup piston 63 is in its extreme rightward position as shown in FIG. 1. This will enable adjustment of the null position of the valve spool when there is no signal input to the servovalve.

It will be seen that when supply pressure is zero so that no pressure exists in actuating chamber 67 and likewise no pressure exists in right spool end chamber 29, spool end spring 64 will have expanded so that backup piston 63 will have moved to the position depicted in FIG. 2 in which piston surface 76 engages stop surface 74. In this condition of the parts and assuming there is no signal input to the servovalve, spring 64 will exert no force either on backup piston 63 or valve spool 21, whereby this valve spool will still maintain its null position relative to the ports 14–16.

As described supra, when supply pressure is below a predetermined minimum operating level, the reaction member will engage the tip of nozzle member 33 closing the bore thereof so that supply pressure exists in control chamber 30 and also in right spool end chamber 29. The same supply pressure exists in actuating chamber 67 for backup piston 63 and the pressure force against this piston will strike a force balance with the oppositely directed force exerted by spring 64 so that piston 63 will assume a position intermediate the two extreme positions depicted in FIGS. 1 and 2. The spring rate of this spring 64 is selected so that valve spool 21 is maintained in a null position when there is no signal input to the servovalve and supply pressure is anywhere below the aforementioned predetermined minimum operating level. Typically, this predetermined pressure level may be about 500 p.s.i.

It is also pointed out that the valve spool will tend to remain centered or in a null position when there is no signal input to the servovalve and especially when fluid supply pressure is rising or falling but below the predetermined minimum operating level. This is due to the Bernoulli force or flow force which always acts in a direction tending to close the spool orifice opening, as understood by those skilled in the art.

The condition usually encountered when the supply pressure is below a predetermined minimum operating level is during start-up or close-down of the hydraulic pressurizing means such as a pump (not shown) which is arranged to supply pressurized fluid to pressure passage port 20.

From the foregoing, it will be seen that the present invention provides an improved servovalve having a movable spring backup for the valve spool and so arranged as to maintain this spool in a null condition when the supply pressure is below a predetermined minimum operating level and there is no signal input to the servovalve, and therefore prevents hardover displacement of the valve spool.

Since variations and changes in construction may occur to those skilled in the art without departing from the spirit of the present invention such as providing a shape of valve slide other than a cylindrical valve spool or providing a bushing in the body to receive the valve spool, the embodiment shown and described is illustrative and not limitative of the invention which is to be measured by the scope of the appended claims.

I claim:
1. In a servovalve including a body having a slideway, a valve slide movably arranged in said slideway to provide slide end chambers at opposite ends of said slide, means for regulating the pressure of fluid in one of said end chambers, passage means in said body for supplying pressurized fluid to said regulating means, and spring means arranged in the other of said end chambers and biasing said slide toward said one of said end chambers, the improvement which comprises fluid driven backup means for said spring means and movable relative to said body axially of said slide, means applying the pressure of fluid in said passage means against said backup means to urge said backup means to move toward said slide, and means limiting movement of said backup means relative to said body in opposite directions.

2. A servovalve according to claim 1 wherein said limiting means includes a stop engaged by said backup means when driven in a direction toward said slide by fluid above a predetermined pressure level, said spring means cooperating with said regulating means when there is no signal input to the servovalve to maintain said slide in a null position.

3. A servovalve according to claim 1 wherein said backup means is positioned intermediate the limits of its movement permitted by said limiting means when said pressure of fluid in said passage means is above zero but below a predetermined level, the position of said backup means being determined by a force balance between the spring force exerted thereon by said spring means and the pressure force thereon exerted by said fluid, and said limiting means including a stop engaged by said backup means when said pressure and spring forces are zero, whereby said slide is maintained in a null position when there is no signal input to the servovalve and said pressure is anywhere below said level.

4. A servovalve according to claim 1 wherein said limiting means includes a first stop engaged by said backup means when driven in a direction toward said slide by fluid when above a predetermined pressure level and also includes a second stop engaged by said backup means when the pressure of fluid in said passage means is zero, said backup means being positioned intermediate said stop when the fluid pressure is between zero and said predetermined level and determined by a force balance between the spring force exerted by said spring means and the pressure force exerted by the fluid, whereby said slide is maintained in a null position at all times when there is no signal input to the servovalve.

5. A servovalve according to claim 4 wherein said backup means includes a piston slidably arranged in said bore, said spring means is operatively interposed between said slide and piston, and said pressure applying means includes a branch passage communicatively connecting said fluid supply passage means to the end face of said piston on the side thereof opposite from said spring means.

6. A servovalve according to claim 5 wherein said stops are oppositely facing surfaces on a member adjustably mounted on said body for movement axially of said slide, and said piston has surfaces spaced apart axially farther than said stop surfaces and arranged severally to engage said stop surfaces.

References Cited

UNITED STATES PATENTS 2,625,136    1/1953    Moog _____ 137—625.61

HENRY T. KLINKSIEK, *Primary Examiner.*

U.S. Cl. X.R.

91—417; 251—141

UNITED STATES PATENT OFFICE
CERTIFICATE OF CORRECTION

Patent No. 3,433,266  March 18, 1969

Jerald D. Bidlack

It is certified that error appears in the above identified patent and that said Letters Patent are hereby corrected as shown below:

Column 2, line 34, "lob" should read -- lobe --; line 37, "cylindrical lobe 23 and a right cylindrical end lobe 24" should read -- center lobe 23 closes pressure port 15, and right lobe 24 --.

Signed and sealed this 31st day of March 1970.

(SEAL)
Attest:

Edward M. Fletcher, Jr.

Attesting Officer

WILLIAM E. SCHUYLER, JR.

Commissioner of Patents